United States Patent [19]

Kobayashi et al.

[11] Patent Number: 4,912,621
[45] Date of Patent: Mar. 27, 1990

[54] CURRENT-BALANCE SWITCHING REGULATOR

[75] Inventors: Kazuo Kobayashi; Hiroo Tanaka, both of Kawasaki; Fumiaki Ihara, Tokyo-To; Katsuyuki Asahi, Machida; Osamu Kinoshita, Yokohama, all of Japan

[73] Assignee: Fujitsu Denso Ltd., Kanagawa, Japan

[21] Appl. No.: 313,058

[22] Filed: Feb. 21, 1989

[30] Foreign Application Priority Data

Feb. 27, 1988 [JP] Japan .................................. 63-43323

[51] Int. Cl.⁴ .......................................... H02M 3/335
[52] U.S. Cl. ....................................... 363/71; 363/21; 363/97
[58] Field of Search ...................... 363/20, 21, 65, 71, 363/72, 97; 307/43, 52, 53, 58, 82

[56] References Cited

U.S. PATENT DOCUMENTS

| 4,149,233 | 4/1979 | Nagano | 363/71 |
|---|---|---|---|
| 4,174,534 | 11/1979 | Kotlarewsky | 363/72 |
| 4,270,165 | 5/1981 | Carpenter et al. | 363/65 |
| 4,313,155 | 1/1982 | Bock et al. | 363/71 |
| 4,338,658 | 7/1982 | Toy | 363/72 |
| 4,425,613 | 1/1984 | Shelly | 363/71 |
| 4,609,828 | 9/1986 | Small | 363/71 |
| 4,635,178 | 1/1987 | Greenhalgh | 363/65 |
| 4,734,844 | 3/1988 | Rhoads | 363/65 |
| 4,766,364 | 8/1988 | Biamonte et al. | 363/65 |

Primary Examiner—Peter S. Wong
Attorney, Agent, or Firm—Kalish & Gilster

[57] ABSTRACT

A current-balance switching regulator in which a plurality of switching power source portions are connected in parallel for the purpose of supplying a stabilized output voltage to a load. Each of the switching power source portions includes a switching control portion for controlling a switching element connected to the primary side of a transformer in accordance with the output voltage on the secondary side of the transformer. Current is detected on the primary side of the portions. When a current unbalance is detected, current balance is arranged by adding the amount of unbalance equally among the portions, so concentration of the load to a particular portion can be prevented. As a result of such averaging, the life of each portion can be lengthened. The portions are connected so that one is made a master and the rest are slaves, so the output voltage can be determined by a variable resistor or the like. A limiter is provided to limit the amount of unbalance added, and an integrator is provided so the amount of unbalance added is smooth so that operation is stabilized.

3 Claims, 5 Drawing Sheets

CURRENT-BALANCE SWITCHING REGULATOR

BACKGROUND OF THE INVENTION

The present invention relates to a current-balance switching regulator in which a plurality of switching power source portions are connected in parallel so that a stabilized voltage can be supplied to a load.

Switching regulators capable of supplying several thousands of amperes with just a few volts are in general structured by connecting in parallel a plurality of switching power source portions and are required to be arranged that each of the switching power source portions effectively conducts the load assignment.

For example, a current of substantially 2000A is required from a voltage of +5V in a large-sized computer system which supplies a load for which a stabilized voltage must be supplied. A switching regulator used for supplying such low voltages and high currents is in general structured by connecting in parallel a plurality of switching power source portions.

FIG. 4 illustrates a conventional switching regulator, in which, in a case where switching power source portions 41 to 44 are respectively capable of supplying a current of 500A with +5V, a current of 2000A can be supplied to a load 40 with +5V by connecting in parallel four switching power source portions 41 to 44. Referring to this drawing, reference numeral 45 represents an AC power source. When the switching power source portions 41 to 44 are connected in parallel as described above, the relationship between the output voltages V1 to V4 are, for example, determined to be V1>V2>V3>V4. The voltage difference in this case is substantially several tens of millivolts.

Assuming that the overcurrent protection for each of the switching power source portions 41 to 44 is 500A the output voltage V1 from the switching power source portion 41 is highest in the case where a current of 500A or less passes through the load 40. Therefore, current I1 is solely supplied from this switching power source portion 41. In a case where a current of 1000A or less passes through the load 40, the overcurrent protection function of the switching power source portion 41 is activated, causing the output voltage V1 thereof to be lowered. As a result of this, a current I2 is also supplied from the switching power source portion 42 of the next output voltage V2.

Therefore, the relationship between the current and the voltage of the load becomes as shown in FIG. 5. Symbols OCP1 to OCP4 represent overcurrent protection operating values. Assuming that point A is an operating point, the voltage of the load 40 becomes a value between V3 and V4, the switching power source portions 41 and 42 supply the maximum rated current, the switching power source portion 43 supplies a fraction of the maximum rated current, and the switching power source portion 44 is brought to a state in which it does not supply any current.

As described above, in the case where a plurality of switching power source portions 41 to 44 are operated in parallel in accordance with the above-described conventional method (overflow method), when the load current exceeds the determined overcurrent protection current for the switching power source portion whose output voltage is set to a high value, the switching power source portion whose output voltage is arranged to be at the second level is also assigned to the load current. Consequently, the load assignment of the switching power source portion whose output voltage is arranged to be high becomes higher. As described above, in the switching power source portion supplying the determined overcurrent protection current and sharing a substantial load assignment, the internal loss becomes too great, causing the heating value to increase, and raising the temperature of the parts. As a result, the life becomes shortened. In particular, each life of parts such as a smoothing capacitor which comprises an electrolytic capacitor, a switching element such as field effect transistor, an output rectifying diode becomes shortened due to rise in temperature. On the other hand, when a forced cooling is performed, the bearing for the fan driving motor or the like becomes shortened due to the exhaust heat, causing a necessity for the same to be changed in a relatively short time period.

Furthermore, when a voltage regulation is performed, the switching power source portions 41 to 44 need to be respectively subjected to the voltage regulation. In addition, since the output current is supplied to the load 40 via the diode, it is substantially impossible for the output voltage of each of the switching power source portions 41 to 44 to be determined to the same level because of the deviations of the parts characteristics. As described above, there arises a problem that the change of the output voltage becomes too large in the whole due to the involved different in the output voltage of each of the switching power source portions 41 to 44.

A novel system capable of overcoming the above-described type of defects involved in the parallel operation of the switching power source portions in accordance with the above-described overflow method is disclosed in Japanese Patent Laid-Open No. 60-134771 (the application whose priority date is on the 4th, Nov., 1983 in accordance with the U.S. Pat. Ser. No. 549259, now U.S. Pat. No. 4,635,178). The content of the same will be summarized as follows.

FIG. 6 illustrates the novel system arranged in such a manner that, as an alternative to the parallel operation of a plurality of switching power source portions displaying a plain characteristic upon output voltage-current to the determined overcurrent protection current, a plurality of switching power source portions displaying a predetermined inclination characteristics upon current-output voltage are in parallel operated. As means for making the characteristic upon current-output voltage of each of the switching power source portions as described above, a circuit is employed comprises, as shown in FIG. 6, a shunt resistor Rs, a linear reduction offset amplifier A4, a current sensitive amplifier A3, potential division resistors R2 and R3, a transient current amplifier A5, a transistor Q1, a resistor RC, a referential amplifier A1, a programmed resistor Rp, and a precise reference voltage source 28. When the current passing through the shunt current Rs is changed from zero to level detected as the determined overcurrent protection current, the voltage generated at the shunt resistor Rs is amplified by the linear reduction offset amplifier A4 and the current sensitive amplifier A3, and the thus-amplified voltage is then applied to the current division resistors R2 and R3. At the intersection of these resistors, a voltage for reducing the current to be supplied to the positive input of the error amplifier A2 from the referential amplifier A is generated. That is, a voltage corresponding to the level of the current which passes through the shunt resistor Rs is generated at the intersection between the potential division resistors R2 and R3, and the current corresponding to the thus-generated voltage passes via the transistor Q1 and the resistor RC. Therefore, a current which decreases in accordance with increase in the load current is supplied, as an alternative to a constant current to the positive input of the error amplifier A2. As a result, when the current corresponding to the load current is introduced into the negative input of the error amplifier A2, the switching element disposed in a current converter/output filter is switched by this error amplifier 2, and the characteristic upon current-output voltage which outputs therefrom becomes the characteristic described above.

When a certain switching power source portion is intended to be shifted in the direction which burdens the load greater, the output voltage from its switching power source portion decreases due to its characteristics. It leads to a fact that the compulsory force to assign the load to the portion other than this switching power source portion is generated. Such operation is respectively generated between each of the switching power source portions. As a result, the switching control systems for the corresponding switching power source portions are, in the whole, structured to make the load assignment substantially uniform distribution.

In this type of conventional system (drooping system), unbalance generated at the time of load assignment of each of the switching power source portion is substantially overcome, and the defects arise in accordance with this can also be overcome.

However, in order to overcome the above-described objects, the nominal initial voltage level of each of the switching power source portions needs to be determined to be the same level. If they are not determined to be the same level, a tendency can appear that the load is concentrated at the switching power source portion which displays a high nominal initial voltage level. Similarly, if a difference lies in the inclination of the characteristic upon current-output voltage for each of the switching power source portion, an unbalance of the load assignment is also be generated. Therefore, the reference voltage source 28 needs to be made precise and stable. Since the characteristic upon current-output voltage involves the inclination, differing from the above-describe overflow method, the change in the output voltage in accordance with change in the load, that is, the deterioration in the precision of the output voltage is, involved to be generated.

SUMMARY OF THE INVENTION

To this end, an object of the present invention is to lengthen the life by averaging the load assignment and to reduce the difference in the output voltage and also to easily regulate the output voltage.

A current-balance switching regulator according to the present invention is to arrange the current balance between each of the switching power source portions by detecting the current on the primary side of the switching power source portion. It will be described with reference to FIG. 1.

For a plurality of switching power source portions 4-1 to 4-n, a current detecting portion 5 which detects the current on the primary side of a transformer 1 so that the amount of unbalance from the current on the primary side of the other switching power source portion is detected, a voltage determination portion 6 for determining output voltage, and an adder portion 7 for adding a control signal to a switching control portion 3 which controls the switching element 2 are provided. Furthermore, one of a plurality of the switching power source portions 4-1 to 4-n is made a master and others are made the slave switching power source portions. Then the connection is so established in such a manner that the level determined for the voltage determination portion 6 of the master switching power source portion 4-1 is arranged to be added to the adder portion 7 as the determined level for the voltage determination portion 6 of the slave switching power source portions 4-2 to 4-n. In addition, the amount of unbalance of the current on the primary side of the transformer 1 detected by the current detection portion 5 of each of the switching power source portions 4-1 to 4-n is arranged to be added to the adder portion 7.

Furthermore, by providing a limiter portion 8, the amount of unbalance added to the adder portion 7 is limited, and by providing an integrator 9, the amount of unbalance added to the adder 7 is smoothed so that the operation is intended to be stabilized.

According to the present invention, the value determined for the voltage determination portion 6 is added to the switching control portion 3 via the adder portion 7 so that the control is so performed by the switching control portion 3, in the case where the output voltage is determined to a high value, the time period in which the switching element 2 is lengthened. Furthermore, when an output voltage is determined in the master switching power source portion 4-1 by a variable resistor or the like, the thus-determined value is added to the adder portion 7 of the slave switching power source portions 4-2 to 4-n, and the level determined for the voltage determination portion 6 of the salve switching power source portions 4-2 to 4-n is clamped to the value determined for the master switching power source portion 4-1. Therefore, the output voltage can be determined in the master switching power source portion 4-1.

Furthermore, by detecting the current on the primary side of the transformer 1, and with a current voltage conversion or the like, the regulation is so performed in such a manner that the value of the current detected when each of the switching power source portions 4-1 to 4-n supplies the maximum rated current is made the same. In order to make the thus-detected value of the current detected the same in the current detection portion 5 of each of the switching power source portions 4-1 to 4-n, the switching element 2 is controlled. This switching element 2 is controlled by adding the amount of unbalance of the detected current value between each of the switching power source portions 4-1 to 4-n via the adder portion 7. Therefore, in a case where each of the switching power source portions 4-1 to 4-n are arranged to have the same rate, all of them are arranged to burden the same load. Therefore, the concentration of the load to a particular switching power source portion can be avoided and the load distribution can be averaged. As a result of this, the life can be lengthened.

The limiter portion 8 serves to limit the maximum value of the amount of unbalance for the purpose of preventing the extreme control even if the rise of the output voltage generates the deviations when power is supplied to the switching power source portions 4-1 to 4-n, causing for unbalance in the load current distribution to become enlarged.

The integrator 9 serves to realize the control of the switching element 2 with the amount of the direct current of the amount of the unbalance so that the operation is stabilized.

DESCRIPTION OF THE PREFERRED EMBODIMENT

An embodiment of the present invention will now be described with reference to the drawings.

Figure 1:
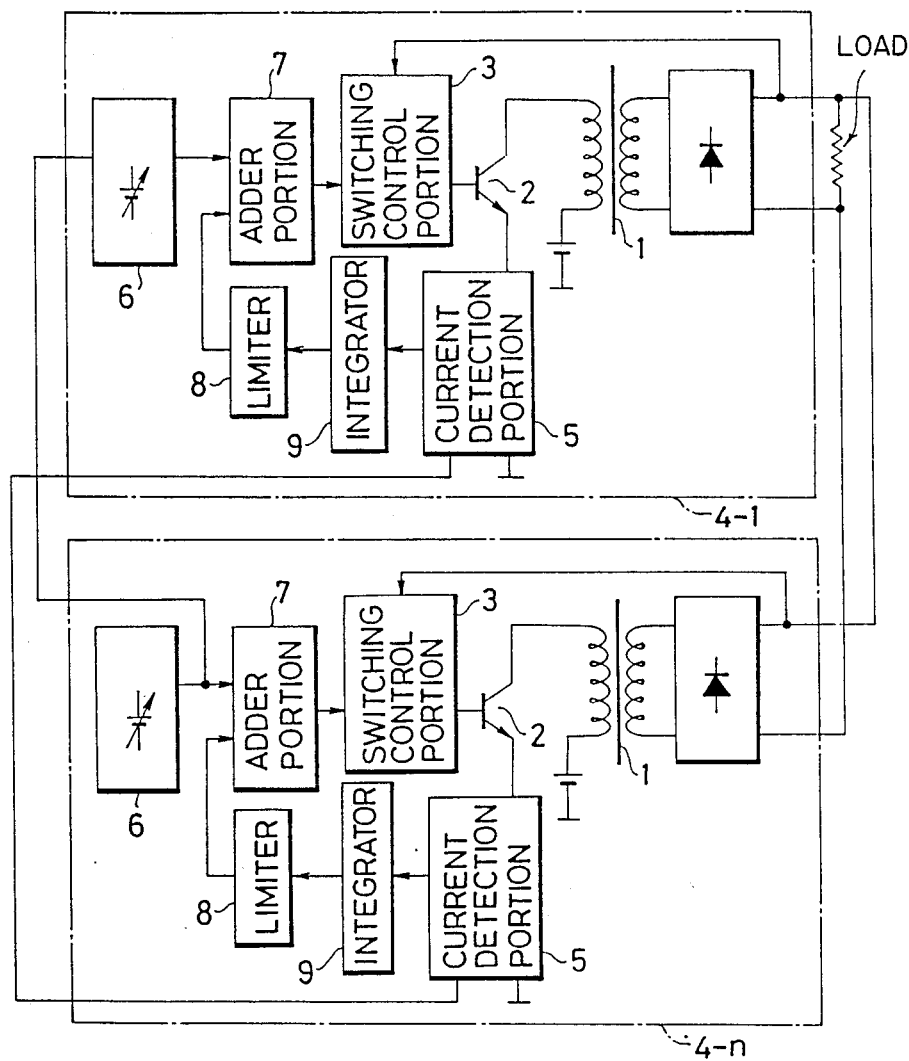
FIG. 1 illustrates the principle of the present invention.
Figure 2:
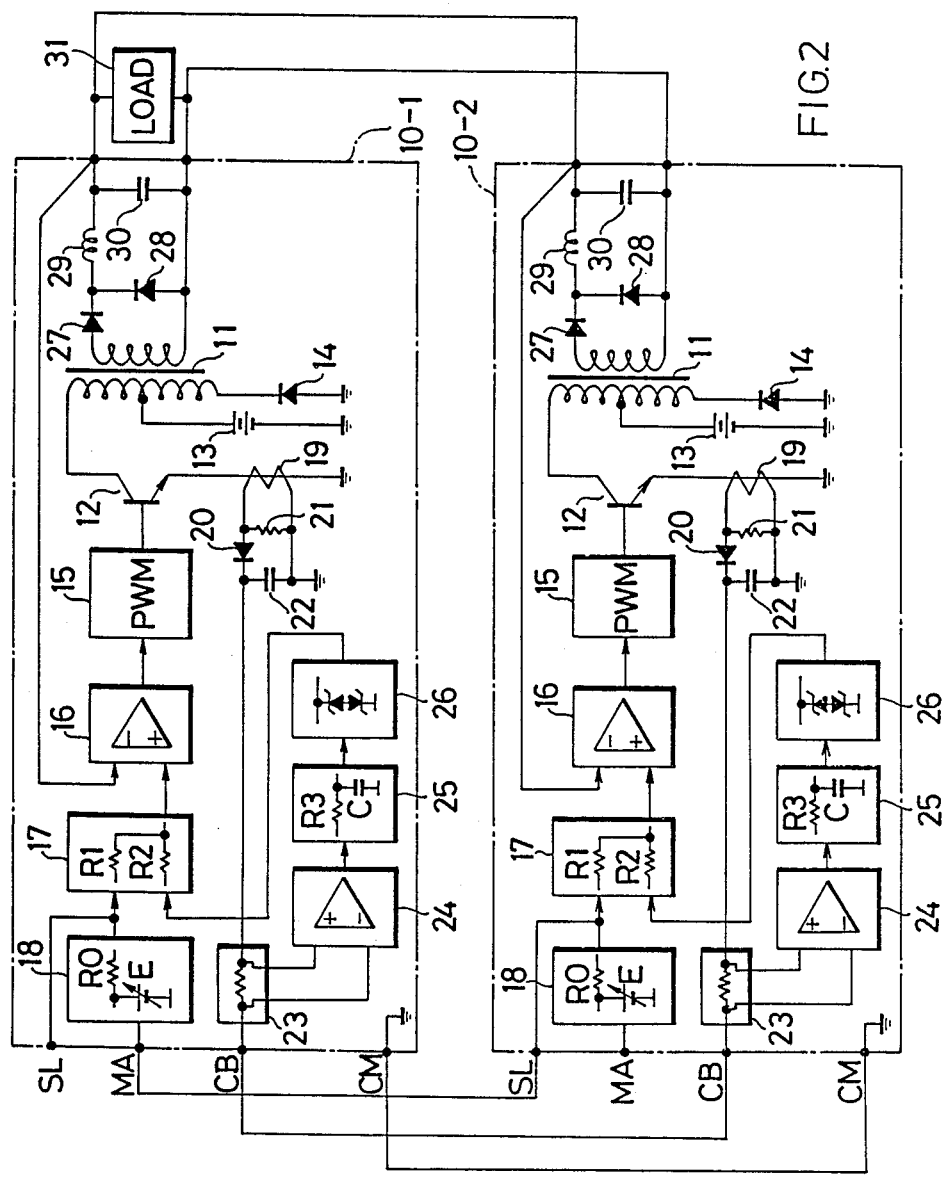
FIG. 2 is a block diagram used for an embodiment of the present invention.

FIG. 2 is a block diagram of an embodiment of the present invention, with which the case is illustrated that an electric power is supplied to a load 31 by connecting in parallel two switching power source portions 10-1 and 10-2. Referring to this drawing, reference numeral 11 represents a transformer, reference numeral 12 represents a transistor serving as a switching element, reference numeral 13 represents a DC power source (the power source which has been obtained by rectifying an AC by a rectifying circuit which is omitted from illustration). Reference numeral 14 represents a diode, reference numeral 15 represents a pulse width control circuit (PWM), and reference numeral 16 represents an error amplifier. Reference numeral 17 represents a resistance adder, reference numeral 18 represents a voltage determination circuit, and reference numeral 19 represents a current transformer. Reference numeral 20 represents a diode, reference numeral 21 represents a resistor, and reference numeral 22 represents a capacitor. Reference numeral 23 represents a resistor for obtaining the amount of unbalance, reference numeral 24 represents a differential amplifier, and reference numeral 25 represents an integrating circuit. Reference numeral 26 represents a limiter circuit, reference numerals 27 and 28 represent rectifying diodes, reference numeral 29 represents a choke coil, and reference numeral 30 represents a capacitor. In addition, symbols SL represent a slave terminal, symbols MA represents a master terminal, symbols CB represent a current-balanced terminal, and symbols CM represent a common terminal.

This embodiment is constituted in such a manner that the switching power source portion 10-1 is made the master switching power source portion, while the switching power source portion 10-2 is made the slave power source portion. In this embodiment, the master terminal MA of the master switching power source portion 10-1 and the slave terminal SL of the slave switching power source portion 10-2 are connected to each other, and the current balance terminal CB and the common terminal CM are connected to each other. In addition, the output terminals are respectively connected to the load 31.

The resistance adder 17 comprises, for example, the resistor R1 and R2 so that the determined value from the voltage determination circuit 18 is added to the resistor R1, while the amount of unbalance via the limiter circuit 26 is added to the resistor R2 wherein the same is added, and the thus-added value is then added to the error amplifier 16. The voltage determination circuit 18 comprises a variable voltage source E and an output resistor R0. The variable voltage source E is directly connected to the master terminal MA, and the same is connected to the slave terminal SL via the output resistor R0. The voltages at the two ends of the resistor 23 are input to the differential amplifier 24 so that the current passing though this resistor 23, that is the amount of unbalance, is detected. The integrator 25 comprises, for example, the resistor R3 and the capacitor C for the purpose of absorbing the rapid change of the amount of unbalance by its integrating function. The limiter circuit 26 comprises, for example, Zener diodes of reversed polarity and directly connected, this limiter circuit 26 serving to assist to clamp the change in the amount of unbalance exceeding the voltage value which is determined by the clamping function of these Zener diodes to the value determined by this clamping function.

The structure for stabilizing the rectifying smoothing output voltage on the secondary side of the transformer 11 by controlling the on-off period of the transistor 12 so as to make it to the output voltage determined by the voltage determination circuit 18 is the same as the switching power source portion of the conventional example. The present invention is characterized in that such switching powers source portions are connected in parallel so that the current corresponding to the capacity of each of the switching power source portions can be supplied when the electric power is supplied to the load 31.

In order to achieve this object, the current on the primary side of the transformer 11 is, as the current to be supplied to the load 31 in each of the switching power source portions, detected by current detecting means such as a current transformer 19, and the thus-detected current is then added to the resistor 23 as the DC value detected by the resistor 21, the diode 20 and the capacitor 22. In this case, the value of the resistor 21 is determined in order to obtain the same value such as 1V even if the maximum rated current for the switching power source portions 10-1 and 10-2 are different from each other or they are the same level.

In a case where the maximum rated current for the switching power source portions 10-1 and 10-2 are the same, and when the same currents are respectively supplied to the load 31, the detected value supplied to the resistor 23 becomes the same. Therefore, no current passes between the switching power source portions 10-1 and 10-2 via the resistor 23, as a result of which, the input voltage for the differential amplifier 24 becomes zero.

On the other hand, when the current to be supplied from the switching power source portion 10-1 to the load 31 is great, the detected value to be added to the resistor 23 of the switching power source portion 10-1 becomes larger than the detected value to be added to the resistor 23 of the switching power source portion 10-2. Therefore, the current corresponding to the amount of this difference passes, via the resistor 23, between the switching power source portions 10-1 and 10-2 so that the voltage in proportion to the amount of unbalance is generated at the two ends of the resistor 23 and the thus-generated voltage is then input to the difference amplifier 24.

This amount of unbalance is added to the determined value of the output voltage by the resistance adder 17, and the thus-added value is, via the error amplifier 16, added to the pulse width control circuit 15. As a result of this, the on-off time period of the corresponding transistors 12 is controlled in such a manner that the output voltage from the switching power source portion 10-1 is lowered, while the output voltage from the switching power source portion 10-2 is arisen. Consequently, the balance of the current to be supplied from the switching power source portions 10-1 and 10-2 to the load 31 is maintained.

Furthermore, the determined value by the variable voltage source E of the master switching power source portion 10-1 is added to the resistance R1 of the resistance adder 17 of the slave switching power source portion 10-2. In this state, although the internal impedance of the variable voltage source E approximates to zero and the output resistance R0 is thereby a low resistance value, but has a certain value. Therefore, output voltage from the voltage determination circuit 18 of the slave switching power source portion 10-2 is clamped to the determined value for the voltage determination circuit 18 of the master switching power source portion 10-1, and the output voltage from the slave switching power source portion 10-2 is determined in accordance to this determined value.

In a case where a plurality of slave switching power source portions are provided, the slave terminal SL of each of the slave switching power source portions is connected to the master terminal MA of the master switching power source portion 10-1. As a result, control is so performed by uniforming the voltage to the output voltage which has been determined in the voltage determination circuit 18 of the master switching power source portion 10-1.

Figure 3:
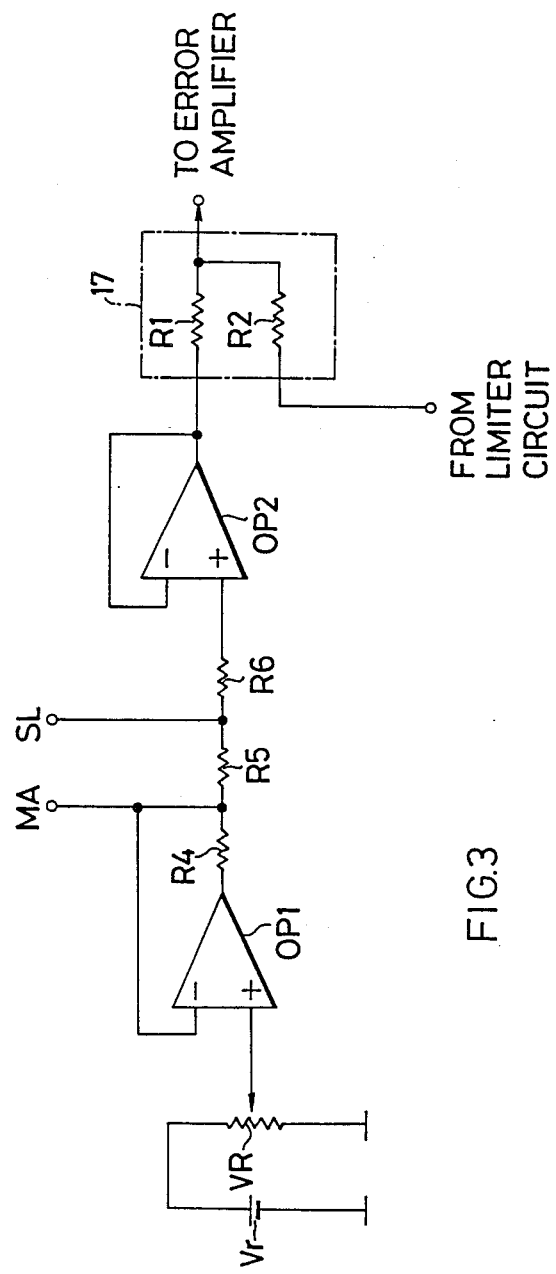
FIG. 3 illustrates essential circuit for a voltage determination circuit.
Figure 4:
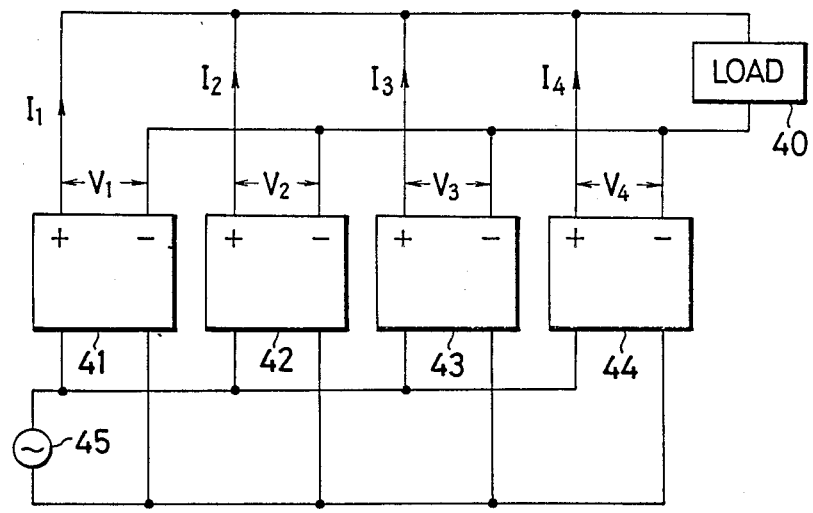
FIG. 4 illustrates a conventional example.
Figure 5:
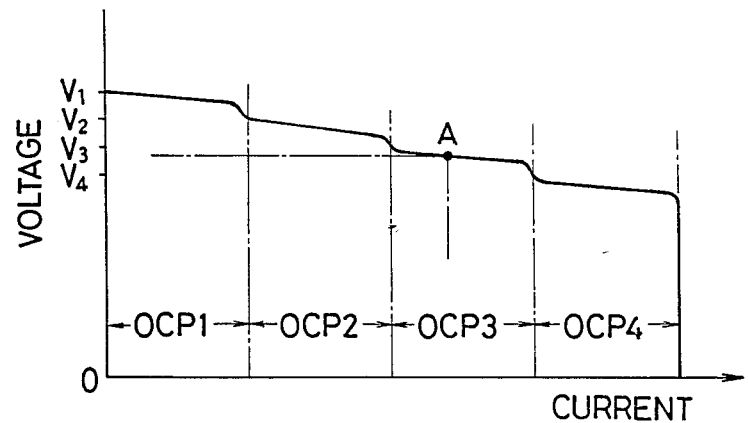
FIG. 5 illustrates characteristics upon current-output voltage.
Figure 6:
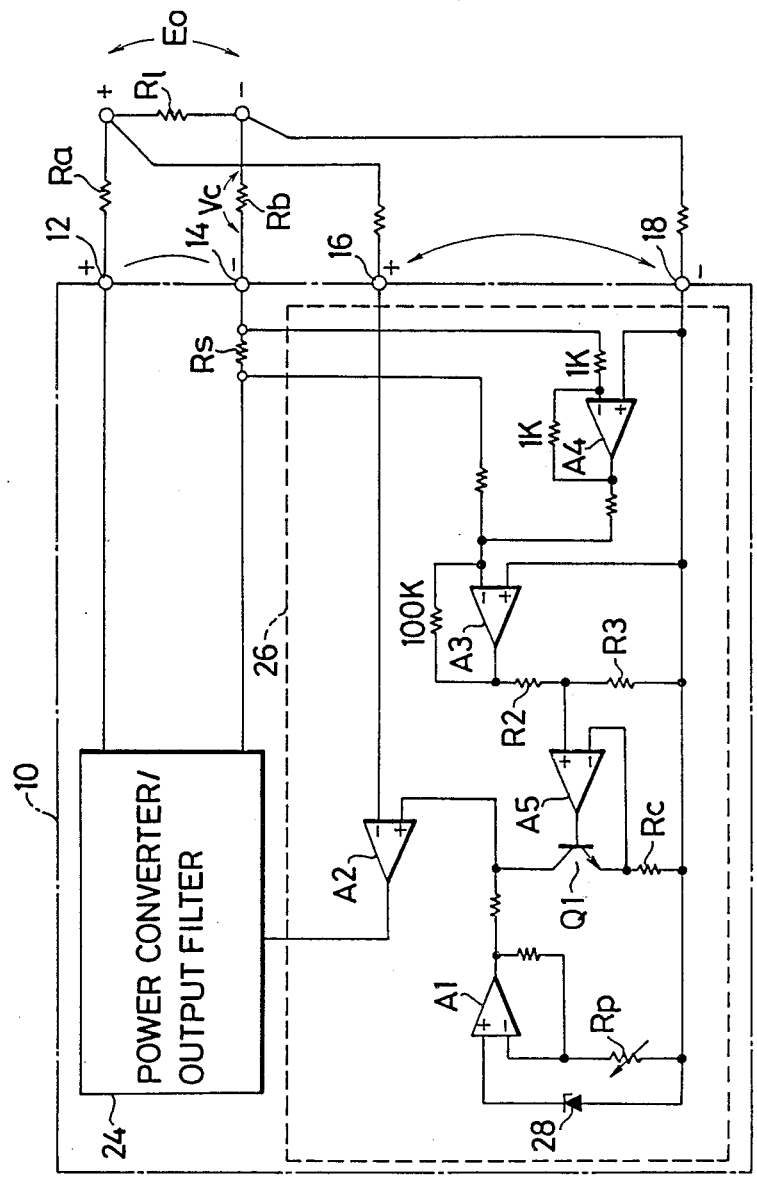
FIG. 6 illustrates another conventional example.

FIG. 3 illustrates an essential portion of the voltage determination circuit, wherein symbols MA represent a master terminal, symbols SL represent a slave terminal, symbols Vr represent a reference voltage source, symbols VR represent a variable resistor, symbols OP1 and OP2 represent arithmetic amplifiers, symbols R4 to R6 represent resistors, and reference numerals 17 represent a resistance adder.

The determined value regulated by the variable resistance VR is output to the master Ma via the arithmetic amplifier OP1 and the resistance R4. The determined value is also input, via the resistors R5 and R6, to the arithmetic amplifier OP2. This determined value is added from the arithmetic amplifier OP2 to the resistor R1 of the resistance adder 17 so that the same is added to the amount of unbalance which has been passed via the limiter circuit, and is added to the error amplifier. Since the determined value is, with a low output impedance, added to the salve switching power source portion from the master terminal MA and as well since the input impedance of the arithmetic amplifier OP2 is great, it is arranged to be clamped to the determined value from the master switch power source portion. That is, the variable voltage source E of the voltage determination circuit 18 shown in FIG. 2 is constituted by the reference voltage source Vr, variable resistor VR, the arithmetic amplifier OP1, and the resistor R4 so that the internal impedance is approximated to zero by the arithmetic amplifier OP1. Furthermore, the output resistance R0 is made equivalent to the resistance R5.

Therefore, the determined value output from the master terminal MA of the master switching power source portion to the slave terminal SL of the slave switching power source portion is added, via the resistance adder 17 to the error amplifier 16 As a result, the pulse width control circuit 15 is controlled in accordance with the difference from the output voltage so that control is performed in such a manner that the output voltage therefrom becomes the same as that of the master switching power source portion.

Referring to FIG. 2, when the master switching power source portion 10-1 and the slave switching power source portion 10-2 are simultaneously operated, the output current from either of them can be arisen first due to the wiring inductance for the load 31 or the deviations of the constants for each of the parts. In this case, since the amount of unbalance becomes great, and the control for balance is operated, the output current of the switching power source portion which has first arises is made reduced. At this time, the output current of the switching power source portion which has first arisen increases, and the amount of unbalance is enlarged, causing for the output current to be reduced. As a result, unstable operation can be performed due the thus-realized seesaw game-like control. However, by limiting the maximum value of the amount of unbalance by the limiter circuit 26, the balancing of the output current can be gradually advanced. As a result, the operation at the time power is supplied can be stabilized. For example, when power is supplied, if a relatively great voltage difference is temporally generated in the output voltage in each of the switching power source portions, the unbalance voltage generated in the resistor 23 of the switching power source portion whose output voltage is low becomes to a certain great value. This unbalance voltage is added, via, the integrating circuit 25 and the limiter 26, to the resistance adder circuit 17. If this unbalance voltage exceeds the clamp voltage of the limiter 26, the unbalance voltage to be added to the resistance adder circuit 17 does not exceed its clamp voltage. Although the output voltage is caused to be raised by the operation of the error amplifier 16 and the pulse width control circuit 15 when the unbalance voltage is generated, an exceeding rise in the output voltage in the switching power source portion which has generated the low output voltage due to the above-described clamping function over the rated voltage can be prevented.

On the other hand, if the control is performed in accordance with the amount of unbalance due to the temporal change (or the rapid change) of the output current, oscillations can be generated (or the surge voltage can be generated), the operation can be stabilized, and generation of the surge voltage can be prevented since the unbalance voltage can be averaged (the responsibility can be moderated) by the integrating circuit 9, causing for the thus-generated oscillations to be added to the resistance adder 17 as the DC factor or the moderated change factor.

In the above-described embodiment, although the current detection is performed on the primary side, the voltage signal obtained by detection performed on the secondary side may be used for the generation of the unbalance voltage in the above-described embodiment.

As described above, according to the present invention, the switching power source portions 4-1 to 4-n are provided with: the current detection portion 5 for detecting the current on the primary side of the transformer 1 so as to detect the amount of unbalance with respect to the current on the primary side of the transformer 1 in the other switching power source portion; the voltage determination portion 6 for determining the output voltage; and the adder portion 7 for adding a control signal to the switching control portion 3 which controls the switching element 2. The connection is so established as to have the determined value for the voltage determining portion 6 of the master switching power source portion 4-1 added to the adder portion 7 as the determine value for the slave switching power source portion 4-2 to 4-n. Furthermore, the connection is so established for the purpose of adding the amount of unbalance of the primary current detected by the current detecting portion 5 of each of the switching power source portions 4-1 to 4-n to the adder portion 7. As a result of the structure, the output voltages from the corresponding switching power source portions 4-1 to 4-n can be determined to be equal to each other including the slave switching power source portions 4-2 to 4-n in the voltage determination portion 6 of the master switching power source portion 4-1. Consequently, an advantage can be obtained that the determination of the output voltage can be easily performed. Furthermore, the load distribution can be performed in accordance with the capacity of each of the switching power source portions 4-1 to 4-n by performing the control in such a manner that the unbalance of the current on the primary side of each of the switching power source portions 4-1 to 4-n is averaged. Therefore, the load concentration to a specific switching power source portion can be prevented, and the rise in the temperature in a plurality of the switching power source portions can be averaged. Consequently, an advantage can be obtained that the life of the overall device can be lengthened.

In addition, by limiting the maximum value of the amount of unbalance to be added to the adder portion 7 by the limiter portion 8, the addition of an extreme large amount of unbalance to the switching control portion 3 via the adder portion 7 when the power source is supplied can be prevented. As a result, the operation is caused to be converged to the normal control state, causing for the operation to be stabilized.

Furthermore, an advantage can be obtained that the operation can be stabilized even if the amount of the unbalance is rapidly changed due to change in the load by integrating, with the integrator 9, the amount of unbalance of the current on the primary side of the transformer 1 due to the current detecting portion 5.

What is claimed is:

1. A current-balance switching regulator wherein a plurality of switching power source portions (4-1 to 4-n) are connected in parallel for the purpose of adding a stabilized output voltage to a load, each of said switching power source portions (4-1 to 4-n) including a switching control portion (3) for controlling a switching element (2) connected to the primary side of a transformer (1) in accordance with the output voltage on the secondary side of said transformer (1), said current-balance switching regulator being characterized by that:

said switching power source portions (4-1 to 4-n) is provided with a current detecting portion (5) for detecting the current on the primary side of said transformer (1) so as to detect the amount of unbalance with respect to the current on the primary side of a transformer of the other switching power source portions, a voltage determination portion (6) for determining said output voltage, and an adder portion (7) for adding a control signal to said switching control portion (3);

a connection is so established in such a manner that one of a plurality of said switching power source portions (4-1 to 4-n) is made a master switching power source portion, while the other switching power source portions are made slave switching power source portions and a determined value for said voltage determination portion (6) of the master switching power source portion (4-1) is added, as the determined value for the voltage determination portion (6) of the slave switching power source portion (4-2 to 4-n), to said adder portion (7); and the connection is also established in such a manner that the amount of unbalance of a current on the primary side of said transformer (1) detected by said current detecting portion (5) of each of said switching power source portions (4-1 to 4-n) is added to said adder portion (7).

2. A current-balance switching regulator according to claim 1, wherein a limiter portion (8) is further provided, said limiter portion (8) acting to limit the maximum value of the amount of unbalance to be added from said current detecting portion (5) to said adder portion (7).

3. A current-balance switching regulator according to either claim 1 or claim 2, wherein an integrator (9) is further provided, said integrator (9) acting to add the amount of unbalance of the current on said primary side of said transformer (1) detected by said current detecting portion (5) to said adder portion (7).

* * * * *